(12) United States Patent
Gila et al.

(10) Patent No.: US 7,567,792 B2
(45) Date of Patent: Jul. 28, 2009

(54) METHOD FOR CONTROLLING THE POWER SUPPLY OF A MOBILE DATA MEMORY, USE OF SAID METHOD IN AN IDENTIFICATION SYSTEM HAVING AT LEAST ONE MOBILE DATA MEMORY

(75) Inventors: Janos Gila, Moedling (AT); Wolfgang Konrad, Moedling (AT); Alexander Renner, Vienna (AT)

(73) Assignee: Siemens Aktiengesellschaft, Munich (DE)

( * ) Notice: Subject to any disclaimer, the term of this patent is extended or adjusted under 35 U.S.C. 154(b) by 693 days.

(21) Appl. No.: 10/928,346

(22) Filed: Aug. 30, 2004

(65) Prior Publication Data

US 2005/0113044 A1 May 26, 2005

Related U.S. Application Data

(63) Continuation of application No. PCT/DE03/00398, filed on Feb. 11, 2003.

(30) Foreign Application Priority Data

Feb. 28, 2002 (DE) .................. 102 08 732

(51) Int. Cl.
*H04B 1/16* (2006.01)
(52) U.S. Cl. .................... 455/343.3; 455/41.2
(58) Field of Classification Search ............ 455/41.1, 455/41.2, 343.1, 343.2, 343.3; 342/51; 340/7.32, 340/7.33
See application file for complete search history.

(56) References Cited

U.S. PATENT DOCUMENTS

| | | | | |
|---|---|---|---|---|
| 5,027,428 | A * | 6/1991 | Ishiguro et al. | 340/7.35 |
| 5,245,346 | A * | 9/1993 | Nishimura et al. | 342/42 |
| 6,282,407 | B1 * | 8/2001 | Vega et al. | 455/14.1 |
| 2001/0018329 | A1 * | 8/2001 | Tada et al. | 455/39 |
| 2003/0203722 | A1 * | 10/2003 | Karlquist et al. | 455/130 |

FOREIGN PATENT DOCUMENTS

| | | |
|---|---|---|
| EP | 0 766 215 A1 | 4/1997 |
| EP | 0 875 851 A2 | 11/1998 |
| GB | 2 284 728 A | 6/1995 |
| WO | WO 01/45280 A1 | 6/2001 |

OTHER PUBLICATIONS

Working Draft—Radio-frequency Identification Standard for Item Management—Air Interface (WD 18000-4); ISO/IEC JTC I/SC 31 WG4 on RFID, Aug. 15, 2001, pp. i-ii, v-vii, 1-7, 34-39, and 54-65.

* cited by examiner

*Primary Examiner*—Nguyen Vo
(74) *Attorney, Agent, or Firm*—Sughrue Mion, PLLC

(57) ABSTRACT

A method for controlling a power supply of a mobile data memory (MDS). The mobile data memory is operable to communicate via wireless data transfer using an antenna (A). The mobile data memory has at least one energy accumulator (BAT), a data demodulator (EMP), a data processing unit (C) and an electronic memory (MEM). The method includes switching to a standby mode from a full operation mode, the standby mode having a lower energy supply than the full operation mode but permitting receipt of the signal. When the mobile data memory receives a signal (ES), the received signal is evaluated to detect at least one backscatter frequency and an associated communication frequency (f1, f2).

33 Claims, 2 Drawing Sheets

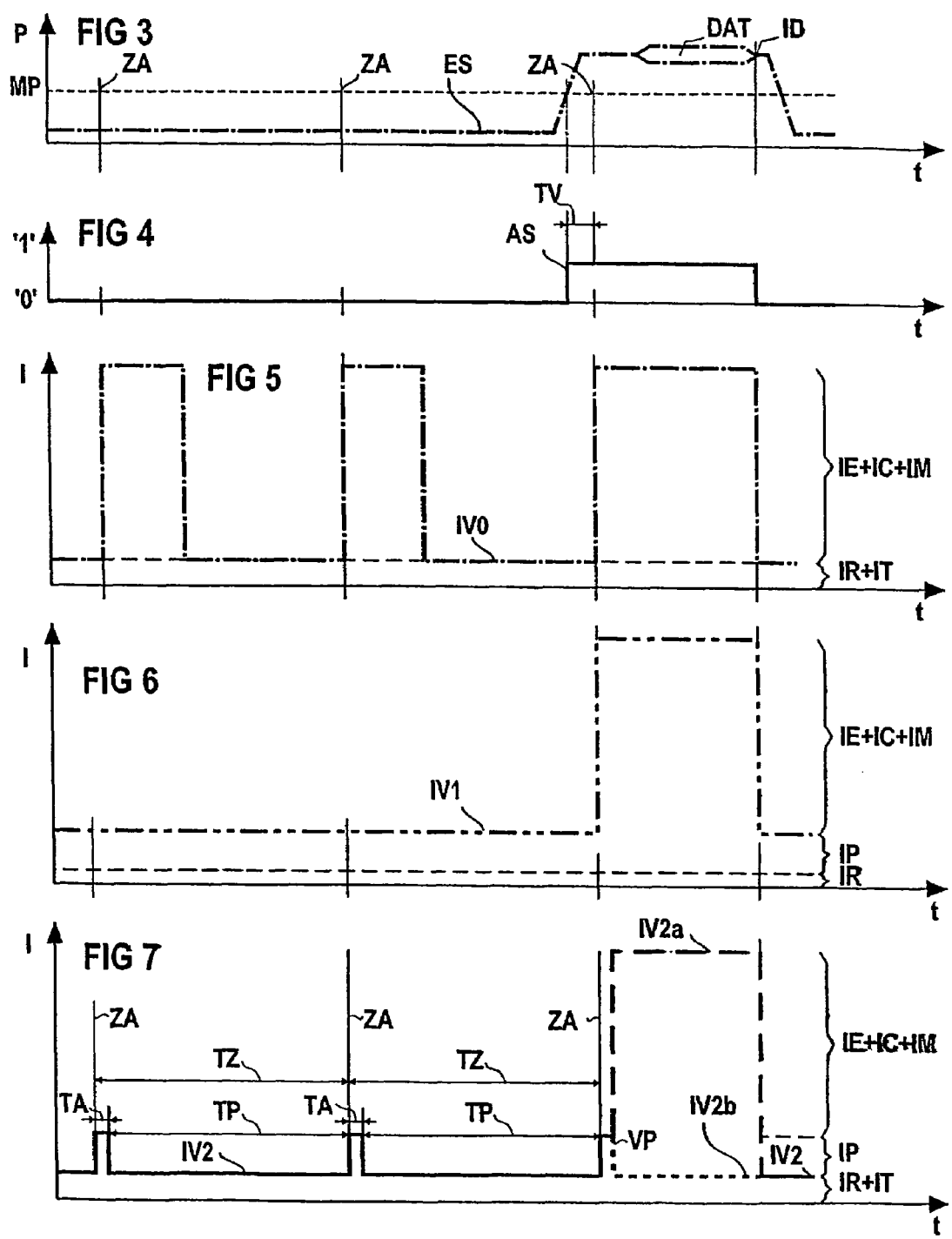

METHOD FOR CONTROLLING THE POWER SUPPLY OF A MOBILE DATA MEMORY, USE OF SAID METHOD IN AN IDENTIFICATION SYSTEM HAVING AT LEAST ONE MOBILE DATA MEMORY

This is a Continuation of International Application PCT/DE03/00398, with an international filing date of Feb. 11, 2003, which was published under PCT Article 21(2) in German, and the disclosure of which is incorporated into this application by reference.

FIELD AND BACKGROUND OF THE INVENTION

The invention relates to a method for controlling the power supply of a mobile data memory that performs wireless data transfer with a read/write device. The mobile data memory has at least one energy accumulator and other consumers of the energy. The invention further relates to a mobile data memory and an identification system with at least one read/write device and a mobile data memory.

GB 2 284 728 discloses a data communication device for wireless data transfer. Such a data communication device which has a control mechanism for the power supply of the data communication device.

In conventional art, identification systems are known, which have one or more stationary read/write devices, which exchange with mobile data memories via a data transfer link using in a wireless fashion. The data exchange is usually radio-based. Such identification systems are commonly used in technical installations where objects or goods must be moved as quickly and freely as possible. These objects are of various types. For example, e.g., packages in a shipping installation, assembly parts in a production line, luggage in a transport system, etc., need to be moved as quickly and freely as possible.

An example of such an identification system is described in the ISO/IEC JTC 1/SC 31 WG4 Draft Standard entitled "Radio Frequency Identification Standard for Item Management—Air Interface, (WD 18000) dated Aug. 15, 2001.

According to the above draft standard, the read/write device polls for the presence of a mobile data memory in the detection range. The read/write device performs the polling by emitting an unmodulated first carrier signal with a pre-definable backscatter frequency. The frequency could be, for example, 2.45 GHz. A mobile data memory located in the reception range passively returns this signal to the read/write device, e.g., by backscattering.

Independently thereof, the mobile data memory modulates the impedance of an integrated transmit/receive antenna in cyclic sequences with a significant identification sequence to identify the mobile data memory in a read/write device. In addition, the read/write device receives time information as to when the mobile data memory switches on its data receiver. If the read/write device can receive the returned modulated backscatter frequency, the validity of the reply is checked. If the reply is determined to be valid, the read-write device, in addition, applies a communication frequency to the carrier signal at the time when the mobile data memory is expected to be ready for receiving.

In the above proposed standard, the communication frequency is shifted relative to the backscatter frequency by a fixed frequency amount, e.g., by approximately 10.6 MHz. By applying the communication frequency, the read/write device signals to the mobile data memory that a data transfer will follow. The second signal with the communication frequency is therefore modulated with data for performing the data transfer.

The transferred data can contain, for example, an identification number of the read/write device. The received signal from the transmit/receive antenna of the mobile data memory is polled cyclically and at short intervals for the presence of the backscatter frequency and the communication frequency. If both frequencies are detected, the data receiver of the mobile data memory remains enabled to receive data.

The mobile data memory usually has an energy accumulator, particularly a battery, for receiving its required supply of power. To enhance the service life of the mobile data memory, it becomes necessary to minimize the power consumption. One conventional way of reducing the power consumption, for example, is to select electronic components that have particularly low power requirements.

Furthermore, the design of a mobile data memory must take into account that a far greater amount of energy is required to receive data than to transmit data. In contrast to the very low power requirement of the initially described passive backscattering in which the antenna impedance is modulated only momentarily, several circuits must be connected for data reception. In addition, these circuits, e.g., data modulators, controllers and electronic memories, require a minimum period before transients subside and the components are ready for operation.

Furthermore, data is generally transferred between the read/write device and the mobile data memories only during a fraction of the total operating period. The above-cited draft standard has proposed, therefore, that the data receiver of the mobile data memory be activated only cyclically to reduce energy consumption. Typically, the pulse duty factor of ON to OFF time is approximately 0.3 to 0.4. During the ON time, the validity of any date present is checked.

Despite the above-described measures, conventional art does not provide techniques for minimizing the power consumption sufficient enough so that is no need to replace the battery during the service life of the mobile data memory. This increases the possibility of the data being stored in the mobile data memory being lost if the battery is exhausted.

A further drawback is that the mobile data memory has to be withdrawn, for example, from the production process to change the battery in time. This can cause delays and can interfere with the process flow. Depending on the application, the required life of a mobile data carrier can be approximately 10 to 15 years.

OBJECTS OF THE INVENTION

One object of the invention is to provide techniques for controlling the power supply of a mobile data memory. Additional objects include providing a mobile data memory for transferring data to at least one read/write device which has an increased service life.

SUMMARY OF THE INVENTION

Some of the objects of the invention are achieved by a method for controlling the power supply of a mobile data memory having a wireless data transfer. The data memory includes at least one energy accumulator and other consumers of the energy. The energy supply is lowered to a standby mode. In the standby mode the data memory is ready to receive data. A received signal is evaluated to detect at least one predefinable backscatter frequency and an associated communication. The energy supply of the data memory is then switched to a fill operating mode.

An aspect of the invention provides a method for controlling a power supply of a mobile data memory. The mobile data memory is operable to communicate via wireless data transfer using an antenna. The mobile data memory comprises least one energy accumulator, a data demodulator, a data processing unit and an electronic memory. The method comprises switching to a standby mode from a full operation mode, the standby mode having a lower energy supply than the full operation mode. The mobile data memory receives a signal. The received signal is evaluated to detect at least one backscatter frequency and an associated communication frequency.

In further enhancements, the energy supply can be further lowered from the standby mode to an inactive sleep mode for a cyclic pause time, such that the ratio of the cyclic pause time to a higher-order cycle time can be at least 10:11 and less than 1. Furthermore, in the full operating mode, the energy supply can be switched to the stand-by mode after receipt of the first data and a valid evaluation. In addition, the received signal can first be preamplified and/or intermediate frequency demodulated. The predefinable backscatter frequency contained in the received signal and the associated communication frequency can thus be intermediate frequency demodulated, such that an intermediate frequency signal can be generated and detected for a possible receipt of data.

Another aspect of the invention is an identification system based on the ISO/IEC 18000 standard for operation in an ISM frequency band. The identification system comprises a mobile data memory. The mobile data memory further included an energy accumulator, an antenna, a data accumulator a data processing unit and an electronic memory. The demodulator is connected to the energy accumulator through a first switch. The data processing unit is connected to the energy accumulator through a second switch and the electronic memory is connected to the energy accumulator through a third switch. The mobile data memory is operable to be switched to a standby mode where an energy supply is lowered. In the standby mode, the data memory is operable to evaluate a received signal to detect at least one backscatter frequency and an associated communication frequency.

The object of the invention is further attained by a mobile data memory for data transfer to at least one read/write device. The mobile data memory comprised an energy accumulator, and a data receiver. An antenna is connected to the data receiver. A level detector is connected to the antenna to detect a level of at least one of a backscatter frequency and an associated communication frequency. The data receiver further includes a data modulator, a data processing unit and en electronic memory. The level detector is operable to connect the data receiver to the energy accumulator.

Further enhancements include an intermediate frequency demodulator, which generates an intermediate frequency signal from the frequencies contained in a received signal, can furthermore be connected ahead of the level detector unit. In addition, the level detector can have a pulse generator, which switches the level detector unit off for a cyclic pause time within a cycle time. At least the level detector and the data demodulator can be integrated on a microchip.

Other aspects of the invention include an identification system based on the ISO/IEC 18000 standard for operation in an ISM frequency band that has a mobile data memory analogous to the one described above.

Yet another aspect of the invention is an identification system that includes a read/write device. It further includes a mobile data memory analogous to the one described above.

Yet another aspect of the invention is a method a method for controlling the power supply of a mobile data memory having a wireless data transfer. The method comprises lowering energy supply to a standby mode where at least one of a set of energy consumers is disconnected from an energy accumulator. A signal is received in the standby mode. The received signal is evaluated to detect a predetermined frequency. The at least one of a set of consumers of energy is reconnected to the energy accumulator to switch on to a full operation mode.

An advantage provided by the invention is that the battery no longer needs to be changed for the full life of the mobile data memory. This advantageously eliminates the associated logistic effort to search for and remove the mobile data memory, e.g., from a production or automation process. Any interference with the process flows can thereby be advantageously avoided.

A further advantage is that it prevents loss of data that could occur if an exhausted battery is not replaced in time.

BRIEF DESCRIPTION OF THE DRAWINGS

The disclosed invention will be explained with reference to the following figures:

FIG. 3 shows an exemplary signal shape of a received signal of a transmit/receive antenna of the mobile data memory.

FIG. 4 shows an exemplary signal shape of a control signal for the electronic switch, the signal being generated by the level detector according to the invention.

FIG. 5 shows an exemplary power consumption curve of a mobile data memory belonging to the conventional art.

FIG. 6 shows an exemplary power consumption curve of the mobile data memory according to the invention.

FIG. 7 shows an exemplary power consumption curve of the embodiment of the mobile data memory according to the invention as shown in FIG. 2.

DETAILED DESCRIPTION OF THE EMBODIMENTS

Figure 1:
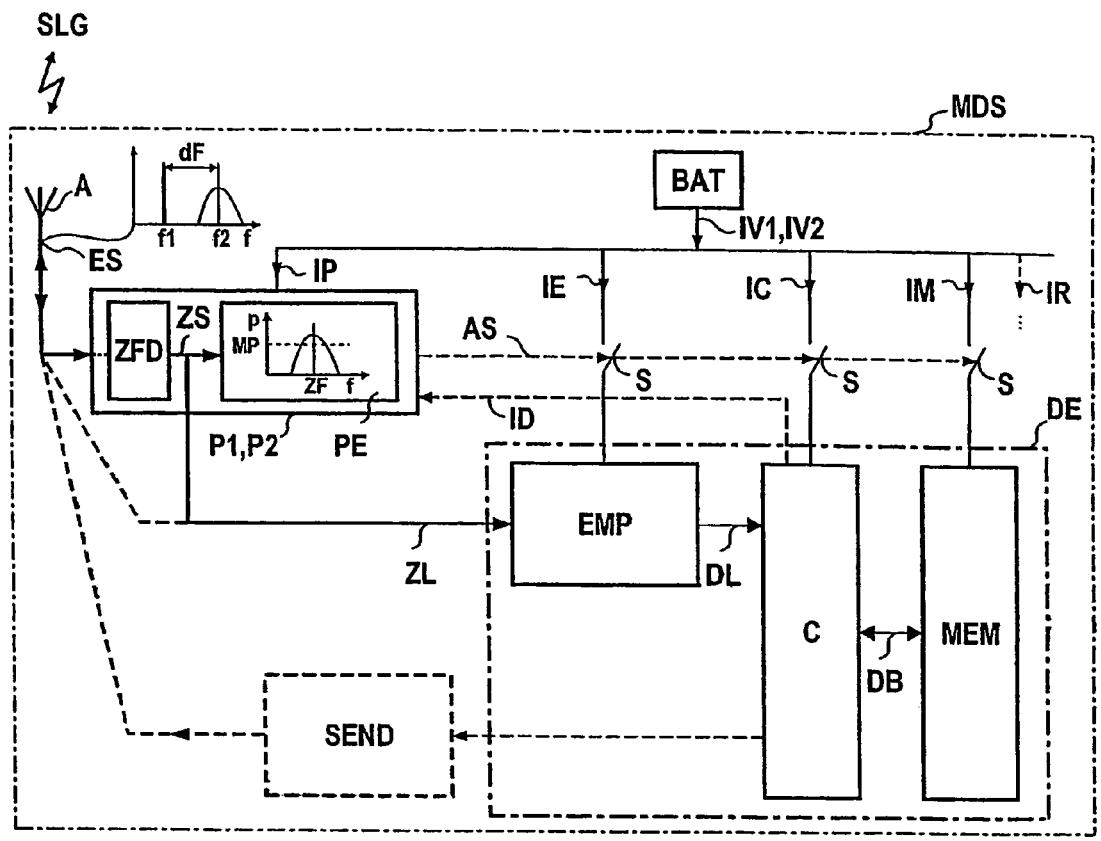
FIG. 1 shows an exemplary structure of a mobile data memory with a level detector according to the invention.

FIG. 1 shows an exemplary structure of a mobile data memory MDS with a level detector P1, P2 embodying aspects of the disclosed invention. The mobile data memory MDS has an exemplary integrated transmit/receive antenna A for exchanging data with a read/write device SLG. A received signal ES, received by the antenna A is supplied to a data receiver DE through a signal line ZL. The data receiver DE furthermore has, for example, a data demodulator EMP to convert the data modulated onto the received signal ES. This data is forwarded for further digital processing to a data processing unit C, e.g., a controller C, connected using a data line DL. The data, possibly processed, is then stored in an electronic memory MEM, which is connected using a data bus DB.

During transmission, data can be forwarded in the opposite direction, as illustrated by a dashed line in FIG. 1. The data from the exemplary controller C is transmitted to a data modulator SEND. The send unit SEND, which is connected to the exemplary common transmit/receive antenna A, can be configured to operate actively or passively. The passive embodiment based on the above-described backscattering method has particularly low power consumption.

The received signal ES from the transmit/receive antenna A is supplied to a level detector P1, P2 for detecting the backscatter frequency f1 for a possible transmission mode. Likewise the level detector P1, P2 attempts to detect the communication frequency f2 for receiving data. Prior to that, the received signal ES can be amplified and subsequently intermediate frequency demodulated ZFD as illustrated in FIG. 1.

The two frequencies f1, f2 are mixed in the received signal ES. Both the frequency sum f1+f2 and the frequency difference f1−f2 (forming the intermediate frequency ZF) is, therefore, present in the mixed signal. The low-frequency signal component (composed of the intermediate frequency signal ZFS that includes the associated intermediate frequency ZF) is far below the two frequencies f1, f2, so that further signal processing is simple. In the example shown in FIG. 1, the advantageous intermediate frequency signal ZFS is subsequently supplied to a level detector unit PE and the data demodulator EMP. Alternatively, the received signal ES can also be supplied directly to the data demodulator EMP, as indicated by the dashed line.

In the example, if a minimum level MP for each of the frequencies f1, f2, or a minimum level MP of the intermediate frequency signal ZFS is exceeded, a set of switches S, e.g., a switching transistor, can be operated by the exemplary control line AS. As shown in the figure a first switch, a second switch and a third switch connect the data demodulator EMP, the data processing unit C and the data memory MEM, respectively, to the energy accumulator BAT. Likewise, the switches S then connect the corresponding components EMP, C, MEM of the data receiver DE to the energy accumulator BAT to enter a full operating mode.

In the closed state, when the switches are on, currents identified in FIG. 1 by the reference symbols IE, IC, IM are passed to the data modulator EMP, the controller C and the electronic memory MEM. IR denotes a minimum current, which is necessary for a sleep mode of the mobile data memory MDS. For example, this minimum current maintains the memory content of the electronic memory MEM. The current identified as IP denotes the operating current of the level detector P1, P2.

Typically, the zero signal current IR of the entire mobile data memory MDS is a few μA. In contrast, the current consumption IP of the level detector P1, P2 is greater by a factor of 100. If, in addition, all the components of the data receiver DE are switched on to receive data, the total power consumption may be increased by another factor of 10 to 20. It should be noted that the associated power consumption IV1 of the entire mobile data memory MDS is depicted in the example shown in FIG. 6. Because the current values for the zero signal current IR, the level detector current IP and the current of the data receiver IE+IC+IM differ widely, only a qualitative representation is provided in FIG. 6.

The exemplary components EMP, C, MEM of the data receiver DE, or only parts thereof, are electrically connected to the energy accumulator BAT only if there is a prompt to transmit data from a read/write device SLG. Only then is the data demodulated signal analyzed and the validity of the data it contains checked.

This has the advantage that compared to, e.g., the 100-fold power requirement of the conventional data receiver, the 0.3 pulse duty factor of ON to OFF time makes it possible to reduce the power consumption by a factor of approximately 30. As a result, a significant increase in the operating period of the mobile data memory MDS is advantageously possible.

Figure 2:
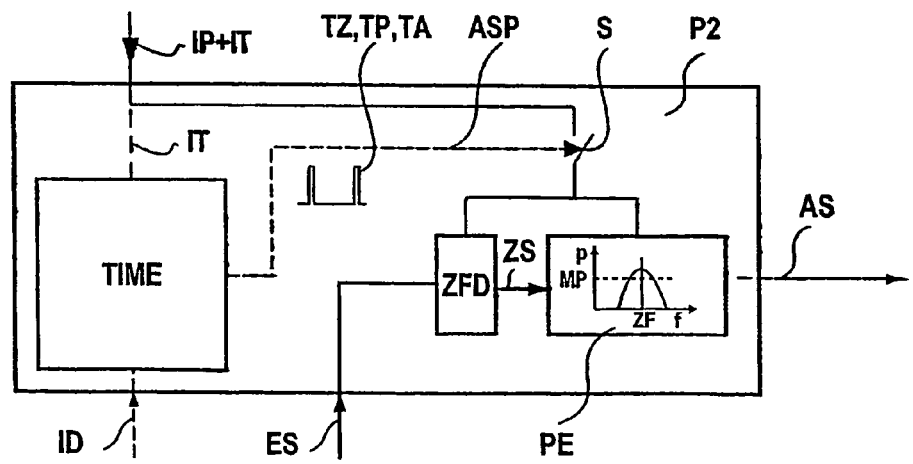
FIG. 2 shows an advantageous exemplary variant of the embodiment of the level detector according to the invention.

FIG. 2 shows another embodiment of the invention, which includes an advantageous exemplary variant of the level detector P2. The level detector P2 has a level detector unit PE (for detecting the two frequencies f1, f2, or the intermediate frequency ZF) and a pulse generator TIME.

In this exemplary embodiment, the pulse generator TIME switches the level detector unit PE and the intermediate frequency demodulator ZFD to an inactive sleep mode IR, IT for a cyclic pause time TP within a cycle time TZ. This switching is done using the exemplary control line ASP. In this sleep mode, the two frequencies f1, f2, or the intermediate frequency ZF, cannot be detected.

IT is the mean power requirement of the pulse generator TIME. It corresponds approximately to that of the zero signal current IR. Detection is possible only during a short cyclic sampling time TA for the standby mode. The sum of the cyclic sampling time TA and the cyclic pause time TP corresponds to the cycle time TZ. This is not depicted in the example of FIG. 2 for reasons of clarity. If, the two frequencies f1, f2, or the intermediate frequency ZF, are detected within the short cyclic sampling time TA, the mobile data memory MDS is switched to the full operating mode for receiving data.

This has the advantage that the operating period of the mobile data memory MDS can be clearly extended by further lowering the power consumption. For example, the power consumption can be reduced by another factor of approximately TA/TZ during a cycle time TZ, i.e., by a factor of approximately 10 to 20.

The ratio of the cyclic pause time TP to a higher-order cycle time TZ can be at least 10:11 and less than 1. The selection of the suitable ratio can advantageously be adjusted such that, for the time during which the mobile data memory MDS resides within the detection range of the read/write device SLG, data can be reliably read from and possibly written to the mobile data memory. This residence time may differ from application to application.

In the exemplary embodiment, after receipt of the first data DAT of the read/write device SLG and after a valid identification ID of the data DAT, the energy supply can be switched from the full operating mode to the stand-by mode. Advantageously, this makes it possible to further reduce the current consumption. For clarification, the associated current consumption curve IV2 of the entire mobile data memory MDS is qualitatively illustrated in the example of FIG. 7.

FIG. 3 shows an exemplary signal shape of a received signal ES from a transmit/receive antenna A of the mobile data memory MDS. Parallel to the time axis t, an exemplary minimum level MP for the frequencies f1, f2 or the intermediate frequency ZF is indicated by a dashed line.

FIG. 4 shows an exemplary signal shape of a control signal AS with the exemplary logic levels '1' and '0' generated by the level detector P1. If the level p of the received signal ES exceeds the minimum level MP, the control signal AS for the set of switches S changes its logic level, for example, from '0' to '1'. The read/write device SLG applies the two frequencies f1, f2 with a lead time TV, such that the frequencies can be detected at the cyclic sampling points ZA of the mobile data memory MDS.

FIG. 5 shows an exemplary current consumption curve IV0 of a mobile data memory of the conventional art in which all the components of the data receiver are switched on at cyclic intervals TZ for a full operating mode. In the inactive sleep mode, the zero signal current IR+IT results.

FIG. 6 shows an exemplary current consumption curve IV1 for a mobile data memory MDS embodying the disclosed teachings. Here, the current consumption IP of the level detector P1, P2 is indicated in addition to the zero signal current IR. In this exemplary embodiment, the two frequencies f1, f2, or the intermediate frequency ZF for receiving data can be detected at an advantageously low total power consumption. All of the components EMP, C, MEM of the data receiver DE are connected to the energy accumulator BAT only when the level detector P1, P2, upon detection, emits a control signal AS for the set of switches S.

FIG. 7 shows an exemplary current consumption curve IV2 of the variant of the mobile data memory MDS depicted in FIG. 2. As shown in FIG. 7, the current consumption IP of the level detector P2 is lowered during a cyclic pause time TP to the zero signal current IR and the current IT necessary for the pulse generator TIME. The mean current IT is comparable in amount to that of the zero signal current IR. In the example of FIG. 7, the two current values IR, IT are therefore combined in one figure to simplify the representation. Furthermore, for a cyclic sampling time TA, which starts at the cyclic sampling instant ZA, there is a change from the inactive sleep mode to the standby mode.

The two frequencies f1, f2 can be detected during the sampling time TA. The sampling time TA can be determined such that, taking into account transient effects and processing times in the level detector P2, a reliable control signal AS can be generated at the end of the sampling time TA. In the example of FIG. 7, the result of the detection is available at the branching point VP. Upon detection, the components are EMP, C and MEM are switched on, resulting in the current consumption curve IV2a. Otherwise, if the two frequencies f1 and f2 are not detected, the mobile data memory returns to the inactive sleep mode with the current consumption IT+IR as shown by the current consumption curve IV2b.

Compared to the example illustrated in FIG. 6, a substantial further reduction in the current consumption is thus advantageously possible.

The above description of the preferred embodiments has been provided by way of example. From the disclosure provided, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A method for controlling a power supply of a mobile data memory, said mobile data memory operable to communicate via wireless data transfer using an antenna, the mobile data memory comprising at least one energy accumulator, a data demodulator, a data processing unit and an electronic memory, the method comprising:
   a) switching to a standby mode from a full operation mode, the standby mode having a lower energy supply than the full operation mode;
   wherein the switching is performed by a set of switches, and
   wherein each switch is assigned to and controls a separate component of the mobile data memory,
   wherein in the full operation mode a first data is received and evaluated for validity, and wherein the energy supply is switched by the set of switches to the standby mode after the first data is received and identified as being valid and prior to completing the wireless data transfer,
   b) receiving a signal during the standby mode; and
   c) evaluating the received signal to detect at least one predetermined backscatter frequency and an associated communication frequency, and
   d) reconnecting the at least one energy accumulator by switching to the full operation mode to transfer a second data after detecting the at least one predetermined backscatter frequency and the associated communication frequency.

2. The method of claim 1, wherein the energy supply for the standby mode is cyclically further lowered from the standby mode to an inactive sleep mode during a cyclic pause time.

3. The method of claim 2, wherein a ratio of the cyclic pause time to a higher-order cycle time is at least 10:11 and less than 1.

4. The method of claim 2, wherein the receiving and evaluating of the received signal to detect at least one backscatter frequency is stopped during the cyclic pause time.

5. The method of claim 1, wherein the received signal is preamplified.

6. The method of claim 1, wherein the received signal is intermediate frequency demodulated.

7. The method of claim 1, wherein the at least one backscatter frequency and the associated communication frequency are intermediate frequency demodulated such that an intermediate frequency signal can be generated and detected for a possible receipt of data.

8. The method of claim 7, wherein if one of the backscatter frequency, the associated communication frequency and the intermediate frequency is detected to be above a threshold, the mobile data memory switches to the full operation mode.

9. The method of claim 8, wherein the switching to the full operation mode is accomplished by sending a signal to at least one of three switches connecting the energy accumulator to the data modulator, the data processing unit and the electronic memory, respectively.

10. An identification system based on the ISO/IEC 18000 standard for operation in an ISM frequency band comprising:
    a mobile data memory,
    said mobile data memory further including:
    an energy accumulator,
    an antenna;
    a data demodulator connected to the energy accumulator through a first switch;
    a data processing unit, connected to the energy accumulator through a second switch and
    an electronic memory connected to the energy accumulator through a third switch,
    wherein the mobile data memory is operable to be switched to a standby mode where an energy supply is lowered, and
    wherein, in the standby mode, the data memory is operable to evaluate a received signal to detect at least one backscatter frequency and an associated communication frequency.

11. The identification system of claim 10, wherein the mobile data memory is operable to be switched to an inactive sleep mode during a cyclic pause time.

12. The identification system of claim 10, wherein a ratio of the cyclic pause time to a higher-order cycle time is at least 10:11 and less than 1.

13. The identification system of 10, wherein the mobile data memory is operable to be switched from a full operating mode to the standby mode after receiving a first data and a valid evaluation.

14. The identification system of claim 10, wherein the identification system is operable to send a signal to at least one of the first, second ant third switches connecting the energy accumulator to the data modulator, data processing unit and the electronic memory, respectively.

15. The identification system of claim 10, wherein the identification system is operable in an ISM frequency band of 2.45 GHz.

16. The identification system of claim 10, wherein the identification system is operable in an ISM frequency band of 5.6 GHz.

17. The identification system of claim 10 wherein the identification system is operable in an ISM frequency band in a UHF frequency range.

18. A mobile data memory comprising:
    an energy accumulator;
    a data receiver;
    an antenna connected to the data receiver;
    a set of switches;
    wherein each switch is assigned to and controls a separate component of the mobile data memory,
    a level detector connected to the antenna to detect a level of at least one of a backscatter frequency and an associated communication frequency;
    the data receiver further including:
    a data demodulator;
    a data processing unit and an electronic memory,
wherein the level detector controls the set of switches to connect the data receiver to the energy accumulator,
wherein in a full operation mode a first data is received and evaluated for validity, and
wherein an energy supply is switched by the set of switches to a standby mode after the first data is received and identified as being valid and prior to completing a wireless data transfer.

19. The mobile data memory of claim 18, wherein the level detector further includes a level detector unit that is operable to control at least one switch to connect the data receiver to the energy accumulator when one of the backscatter frequency and the communication frequency is detected.

20. The mobile data memory of claim 19, wherein an intermediate frequency demodulator, which generates an intermediate frequency signal from the backscatter frequency and the communication frequency contained in a received signal, is connected ahead of the level detector unit.

21. The mobile data memory of claim 19, wherein the level detector has a pulse generator, which switches the level detector unit off for a cyclic pause time within a cycle time.

22. The mobile data memory of claim 21, wherein the detection of the level of at the at least one of the backscatter frequency and the associated communication frequency is stopped during the cyclic pause time.

23. The mobile data memory of claim 19, wherein at least the level detector and the data modulator are integrated on a microchip.

24. An identification system comprising:
a read/write device and
a mobile data memory
wherein the mobile data memory further comprises:
an energy accumulator;
an antenna connected to a data receiver;
a level detector connected to the antenna to detect a level of at least one of a backscatter frequency and an associated communication frequency;
the data receiver further including:
a data demodulator connected to the energy accumulator through a first switch
a data processing unit, connected to the energy accumulator through a second switch and
an electronic memory connected to the energy accumulator through a third switch,
wherein the level detector is operable to connect the data receiver to the energy accumulator.

25. The identification system of claim 24, wherein the level detector further includes a level detector unit that is operable to control at least one of the first switch, the second switch and the third switch when one of the backscatter frequency and the communication frequency is detected.

26. The identification system of claim 24, wherein an intermediate frequency demodulator, which generates an intermediate frequency signal from the backscatter frequency and the communication frequency contained in a received signal, is connected ahead of the level detector unit.

27. The identification system of claim 24, wherein the level detector has a pulse generator, which switches the level detector unit off for a cyclic pause time within a cycle time.

28. The identification system of claim 24, wherein at least the level detector and the data modulator are integrated on a microchip.

29. A method for controlling the power supply of a mobile data memory for wireless data transfer, the method comprising:
receiving and evaluating for validity a first data in the full operation mode;
lowering energy supply to a standby mode where at least one of a set of energy consumers is disconnected from an energy accumulator by a set of switches after the first data is received and identified as being valid and prior to completing the wireless data transfer;
wherein each switch is assigned to and controls a separate component of the mobile data memory,
receiving a signal in the standby mode;
evaluating the received signal to detect a predetermined frequency; and
reconnecting the at least one of the set of consumers of energy to the energy accumulator with the set of switches to switch to a full operation mode to transfer a second data if the predetermined frequency is detected.

30. The method of claim 29, wherein the energy supply for the standby mode is cyclically further lowered from the standby mode to an inactive sleep mode during a cyclic pause time.

31. The method of claim 30, wherein a ratio of the cyclic pause time to a higher-order cycle time is at least 10:11 and less than 1.

32. The method of claim 29, wherein the receiving and evaluating of the received signal to detect a predetermined frequency is stopped during the cyclic pause time.

33. A method for controlling a power supply of a mobile data memory, said mobile data memory operable to communicate via wireless data transfer using an antenna, the mobile data memory comprising at least one energy accumulator, a data demodulator, a data processing unit and an electronic memory, the method comprising:
a) switching to a standby mode from a full operation mode, the standby mode having a lower energy supply than the full operation mode;
wherein the switching is performed by a set of switches, and
wherein each switch is assigned to and controls a separate component of the mobile data memory,
b) receiving a signal during the standby mode; and
c) evaluating the received signal to detect at least one backscatter frequency and an associated communication frequency,
wherein in the full operation mode a first data is received and evaluated for validity,
wherein the energy supply is switched by the set of switches to the standby mode after the first data is received and evaluated for validity,
wherein the at least one backscatter frequency and the associated communication frequency are intermediate frequency demodulated such that an intermediate frequency signal can be generated and detected for a possible receipt of data,
wherein if one of the backscatter frequency, the associated communication frequency and the intermediate frequency is detected to be above a threshold, the mobile data memory switches to the full operation mode, and
wherein the switching to the full operation mode is accomplished by sending a signal to at least one of three switches connecting the energy accumulator to the data modulator, the data processing unit and the electronic memory, respectively.

* * * * *